United States Patent [19]

Korhonen

[11] Patent Number: 4,651,384
[45] Date of Patent: Mar. 24, 1987

[54] SUPPORT APPARATUS FOR BUTCHERING AN ANIMAL QUARTER

[76] Inventor: Kaarlo J. Korhonen, Säterivägen 18, S-161 70 Bromma, Sweden

[21] Appl. No.: 752,019

[22] Filed: Jul. 5, 1985

Related U.S. Application Data

[63] Continuation of Ser. No. 581,573, Feb. 21, 1984, abandoned.

[30] Foreign Application Priority Data

Feb. 18, 1983 [SE] Sweden ................................ 8300919

[51] Int. Cl.$^4$ ............................................. A22C 17/02
[52] U.S. Cl. ........................................................ 17/44
[58] Field of Search .................... 17/1 R, 44; 269/303, 269/46, 91, 93, 71, 76

[56] References Cited

U.S. PATENT DOCUMENTS

| | | | |
|---|---|---|---|
| 472,742 | 4/1892 | Peck | 269/91 |
| 1,724,006 | 8/1929 | Covey | 17/44 |
| 1,928,126 | 9/1933 | Fried | 17/44 |
| 2,459,080 | 1/1949 | Killius | 269/71 |
| 3,190,265 | 6/1965 | Geary | 17/44 X |

Primary Examiner—Willie G. Abercrombie
Attorney, Agent, or Firm—Burns, Doane, Swecker & Mathis

[57] ABSTRACT

A support apparatus for dressing quarters of animals includes a suspension point for the leg end of the quarter, a substantially vertical support plate with a support bar, the longitudinal direction of which is in the vertical plane and parallel to the plate. Spaced under the plate is a lower support plate inclined at an angle to the vertical plane. The horizontal direction of the lower support plate is parallel to that of the plate. The lower support plate has two support rails which are downwardly converging. The leg end suspension point is substantially vertically above the central point of the quarter-supporting surface of the plate.

12 Claims, 6 Drawing Figures

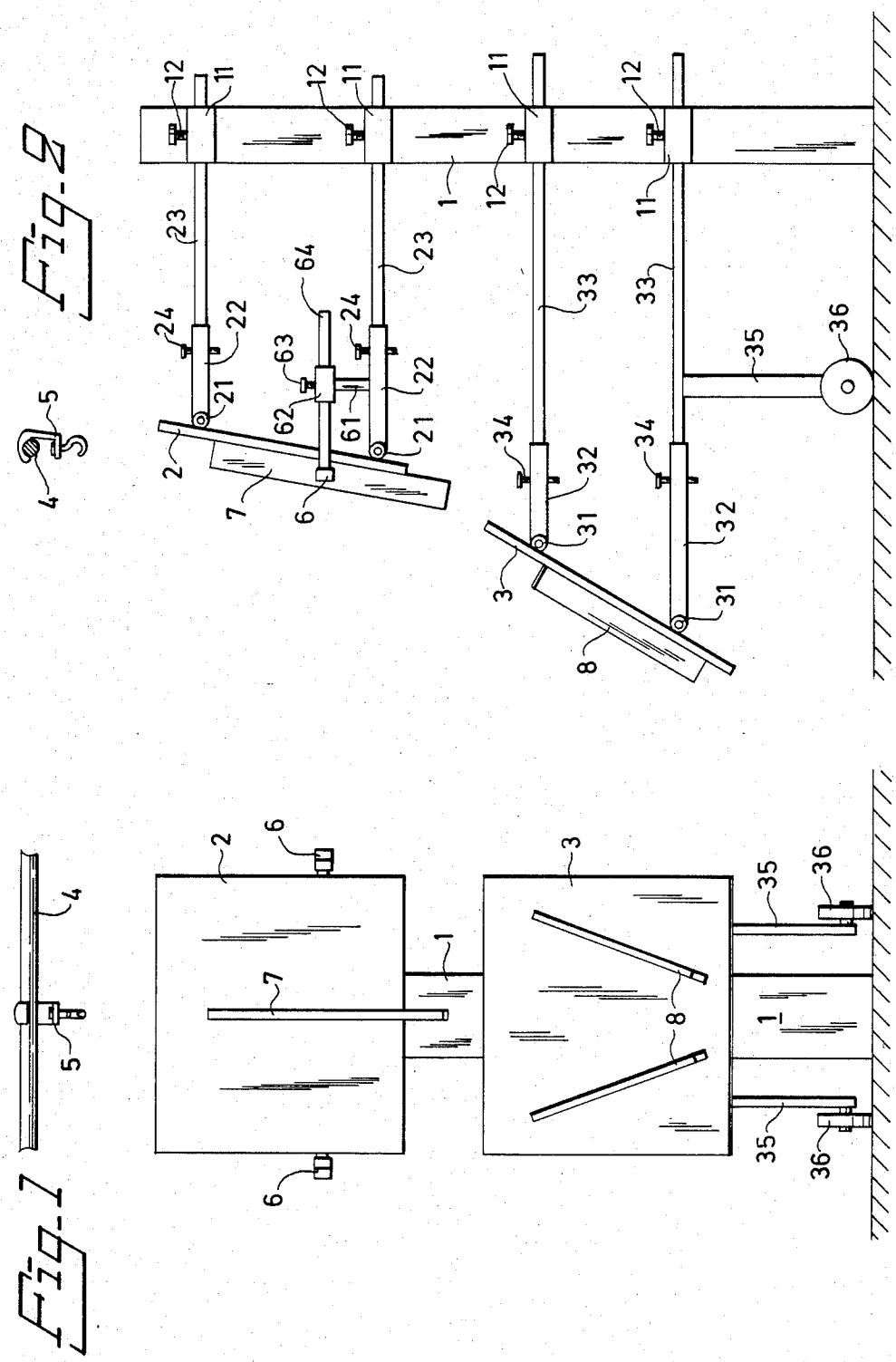

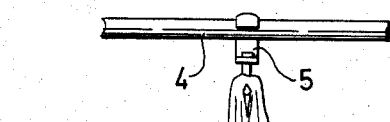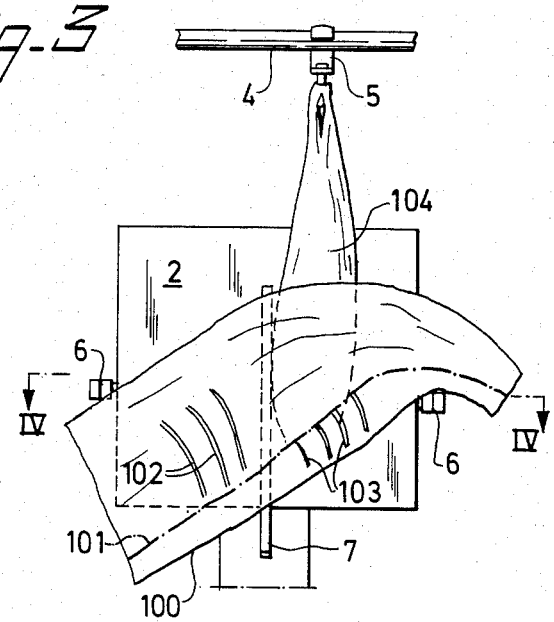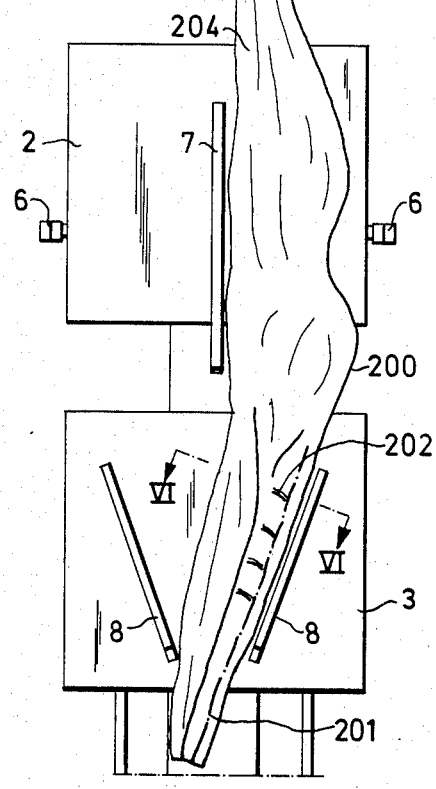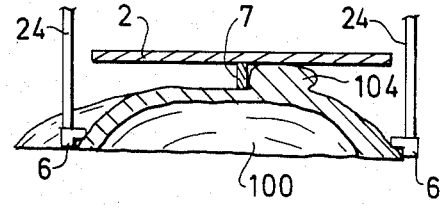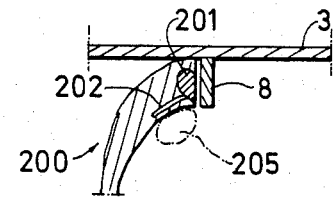

SUPPORT APPARATUS FOR BUTCHERING AN ANIMAL QUARTER

This application is a continuation of application Ser. No. 581,573, filed Feb. 24, 1984 abandoned.

BACKGROUND OF THE INVENTION

1. Technical Field

The invention relates to a support apparatus for butchering, and particularly sawing the bones of an animal quarter, especially of cattle, the quarter being suspended at its leg end.

2. Background Art

Animal carcases which are to be butchered are conventionally divided into quarters, division taking place such that the carcass is cloven along its plane of symmetry, the halves then being parted at approximately half their length. The resulting quarters are hung on hooks, such as those that move on overhead rails suspended in the ceiling for conveyance to wholesale butchering stations.

Particular attention must be paid during butchering to making the meat yield as large as possible, and it is furthermore a pressing desire that the dressing operations be carried out in the shortest possible time for the least possible input of labour.

The invention is based on knowledge of these problems. The meat yield from a hindquarter can be improved if the fillet bones, i.e., the protuberances from the spine between the loins or steak meat and the fillet, are sawn off close to the spine after the fillet has been removed. The loin can then be removed together with the sawn-off fillet bones, and the latter can be easily removed in a subsequent operation. In conventional butchering without sawing off the fillet bones, the butcher's knife will damage the loins and there is no possibility of avoiding cutting away the loin parts lying between adjacent fillet bones.

It has been analogously established that on a forequarter the yield of chuck and entrecote is improved by sawing off the rugged protuberances on the upper side of the spine before the chuck or the entrecote are cut loose, the rugged protuberances being removed from the butchered portion afterwards.

The condition for a total gain in efficiency for the processing mentioned is, however, that means be provided to enable rapid and simple accessibility to the parts in question of the quarter so as to allow cutting off the bone portions in conditions meeting safety requirements. One object of the invention is therefore to provide such means.

SUMMARY OF THE INVENTION

The invention relates to a support apparatus for butchering, and particularly to cutting the bones of an animal quarter hung up by its leg. The apparatus includes a plate, the plane of which is arranged substantially vertically. A support bar on the surface of the plate supports the quarter, the longitudinal direction of the bar being in the vertical plane and substantially parallel to the surface mentioned. The central area of the surface is intended for substantially vertical orientation under a suspension means, such as a hook, carrying the leg part of the quarter. One advantage is that the apparatus may include two support abutments adapted for being placed on either side and spaced from the bar, as well as being substantially at the same height and spacing from the bar, particularly for dressing a quarter in the form of a forequarter from a symmetrically cloven carcass half. The distance between the two abutments may be disposed such that the neck of the forequarter can rest against one abutment and the rear part of the forequarter breastbone edge may rest against the other abutment. The rear edge of the forequarter shoulder and/or shoulder blade portion bears against the side of the bar facing towards the first-mentioned abutment.

For dressing a hindquarter, i.e. the rear part of a symmetrically cloven carcass half, the apparatus may further include a lower support plate with a quarter-supporting surface. The horizontal direction of the lower plate is substantially parallel to the horizontal direction of the quarter-supporting surface of the support plate. The quarter-supporting surface of the lower support plate forms an angle to the vertical plane. The lower support plate is arranged under the support plate and somewhat forward of its support surface. The lower support plate has two separate, downwardly converging support rails, arranged substantially symmetrical in relation to the longitudinal direction of the bar. The apparatus is accordingly arranged to support the hindquarter so that the back of it lies against the lower support plate with the spinal cut lying against and parallel to one support rail, the outside of the hindquarter shank being in contact with the bar.

The abutments are disposed so as to be displaceable in a horizontal direction between a position in front of the support surface of the plate and a position behind this surface.

The support surface of the plate is preferably arranged with a small angle to the vertical direction, for facing somewhat upwards, and the lower support plate slopes with a somewhat larger angle to the vertical.

The lower support plate is preferably arranged so as to be horizontally displaceable from a position in which it can support a hindquarter in contact with the plate to a retracted, out of the way position for a butcher dressing a forequarter.

The abutments preferably have a stepped form as seen in a horizontal view and may include two steps, the step portion on each abutment being at the greatest distance from the support bar projecting farthest out from the support surface of the plate.

The plate and lower plate have the advantage that each is swivelable about a horizontal axis parallel to the support surface of the plate and lower plate respectively so as to allow proper adjustment of their planes to the quarter to be dressed.

The invention will now be described in detail in the following in the form of an embodiment and with reference to the accompanying drawings.

BRIEF DESCRIPTION OF THE DRAWINGS

FIG. 1 is a view from the front of an apparatus in accordance with the invention.

FIG. 2 is a side view of the apparatus according to FIG. 1.

FIG. 3 is a forequarter mounted on the apparatus in accordance with the invention.

FIG. 4 is a section taken along the line IV—IV in FIG. 3.

FIG. 5 is a hindquarter arranged on the apparatus in accordance with the invention.

FIG. 6 is a section along the line VI—VI in FIG. 5.

DETAILED DESCRIPTION OF THE PREFERRED EMBODIMENTS

FIGS. 1 and 2 illustrate an overhead rail 4 on which conventional hooks 5 are displaceable. A plate 2 is arranged with a horizontal direction parallel to the direction of the rail 4, and with a vertical direction extending at a small angle to the vertical. The hook 5 is substantially vertical above the central area of the plate 2. A support bar 7 is arranged on the plate 2, the longitudinal direction of the bar 7 being in the vertical plane and parallel to the plate 2. The greater width dimension of the bar 7 extends perpendicular to the plate 2. An abutment 6 is arranged on either side of the bar 7 and at the same distance from it. The abutments 6 are at the same height and are generally horizontally displaceable substantially normal to the plate 2. Below the plate 2 and in a position somewhat in front of it there is a lower support plate 3, sloping at a somewhat larger angle to the vertical than the plate 2. The lower support plate 3 has two support rails 8 extending along the surface of the plate 3. The rails 8 are arranged symmetrically in relation to the symmetrical plane of the apparatus, and converge downwardly.

Turning now to FIG. 2, it will be seen that the plate 2 is connected to a stand 1 with two telescopic members 22,23, each connected at one end to the plate 2 with a pivotable joint 21 and at the other end by passing through a bushing 11 on the stand 1. The member portions 23 can be clamped in the bushings 11 with clamping screws 12. The parts 22,23 of the telescopic members can be mutually fixed with a locking pin 24. The part 22 of the lower telescopic member carries an upright 61 with a bushing 62 for receiving a horizontal rod 64 carrying the abutment 6. The rod 64 is clamped in a desired horizontal position with a clamping screw 63.

The lower plate 3 is connected to the stand 1 with two telescopic members 32,33 connected to the lower plate 3 with pivotable joints 31. The parts 33 of the members extend through bushings 11 on the stand 1 and can be fixed in the respective bushing with a clamping screw 12. The length of the members is set with locking pins 34. The part 33 of the lower telescopic member has a leg 35 carrying a wheel 36 which can run on the floor.

It will be noted that by altering the length of the telescopic members the slope towards the vertical of the plates 2 and 3 may be altered. The lower plate 3 can be displaced, horizontally supported on the wheels 36, so that the bushings 11 carrying the parts 33 do not need to take up the occurring forces by themselves.

FIG. 3 illustrates a forequarter 100 mounted on the apparatus, the rear side of the shank 104 of the forequarter 100 laying against the bar 7, the abutments 6 bearing against the rear rib edge and the chuck (neckportion) of the forequarter 100. The spine is denoted by 101, ribs by 102 and the rugged protuberances by 103. In the illustrated position the forequarter 100 is entirely stabilized. The operator can now take a machine saw and saw off the protuberances 103 close to the spine 101 and, if so desired, also saw off the ribs 102. The forequarter 100 may be assumed to have been brought into the illustrated position by first being displaced along the rail 4 during which the operator swings out the forequarter 100 somewhat from the vertical plane and then releases it so that it assumes the illustrated position. If so desired, the abutments 6 may be pulled back behind the support surface of the plate 2 when the forequarter 100 is taken in over the plate 2. Then abutments 6 are moved forward to a suitable distance from the surface of the plate 2, the forquarter 100 being swung somewhat so that the abutments 6 catch onto said portions of the forequarter 100. FIG. 4 illustrates how the abutments 6 can have a stepped shape for better mating with the contour of the forequarter 100. Also shown are suiting size variations in successive forequarters which are to be dressed. As shown in FIG. 4, the abutment 6 are provided with step portions 6a and 6b. The stepped portion 6b project further from the support bar 7 then the portion 6a and further from the surface of the plate than the portion 6a. It should be noted that the cleaving plane of the forequarter 100 is substantially parallel to the plate 2.

FIG. 5 illustrates a hindquarter 200 on the apparatus, the spine being denoted by 201 and the fillet bones by 202. The plane of cleavage of the spine is close against and parallel to the support rail 8 and the outside of the round/rump of the hindquarter 200 bears against the support bar 7. The abutment 6 is at a distance from the round/rump, but has a function in that it prevents the hindquarter 200 from falling from the apparatus if the hook 5 were to be unintentionally moved to the right in FIG. 5 which could possibly occur in so-called warm butchery. FIG. 6 indicates the position of the fillet 205, which is thus removed before the operator cuts off the fillet bones 202 close to the spine 201.

It will be understood that the inventive apparatus does not require any special devices for retaining the respective quarter against the plate 2 and lower plate 3, and that the apparatus, due to its symmetrical implementation, does not need to be reset when the quarters to be dressed are alternatingly right- and lefthand quarters. Work at the apparatus is usually carried on such that successive quarters are either forequarters or hindquarters.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

I claim:

1. A support apparatus for butchering, particularly for sawing bones in an animal quarter, particularly from cattle, said quarters being suspended from a leg end, comprising a plate positioned in a generally vertical plane, a support bar connected to a surface of the plate so as to support the quarter on the plate, the bar extending in a substantially vertical direction with respect to the plate and substantially parallel to the surface of the plate, a central portion of the support being displaceable substantially vertically under a suspension means for carrying the leg end of the quarter, abutment elements positioned on either side of, and spaced from, the bar, the abutment elements positioned at substantially equal height and at a substantially equal distance from the bar, the abutment elements being in mirror symmetry to each other along a vertical normal plane to the plate taken along the bar in a longitudinal direction.

2. Support apparatus as claimed in 1, for butchering a quarter in the form of a forequarter of a symmetrically cloved animal carcass half, wherein the distance between the two abutments being such that a neck of the forequarter may rest against one abutment and a rear part of the rib edge of the forequarter may rest against the other abutment, a rear edge of the shank or shoulder blade portion bearing against the side of the bar facing towards said one abutment.

3. Support apparatus as claimed in 2, wherein the abutments are displaceable in a horizontal direction between a position in front of the support surface of the plate and a position behind said surface.

4. Support apparatus as claimed in 3, wherein the abutments have a stepped configuration as viewed horizontally, each of said abutments including at least two stepped portions, the stepped portions on each of said abutments at a greater distance from the support bar and projecting out farthest from the support surface of the plate.

5. A support apparatus as claimed in claim 1 for butchering a quarter in the form of a hindquarter of a symmetrically cloven animal carcass half, wherein a lower support plate has a quarter supporting surface, a horizontal direction of which is substantially parallel to a horizontal direction of the quarter supporting surface of the plate, the quarter-supporting surface of the lower support plate forming an angle to a vertical, in that the lower support plate is disposed under the support plate and generally in front of its support surface and in that the lower support plate has two separate, downwardly converging rails arranged substantially symmetrical in relation to the longitudinal direction of the bar, a back of the hindquarter laying against the lower support plate with a spinal cut against, and parallel to, one support rail, an outside portion of the hindquarter in contact with the bar of the plate.

6. Support apparatus as claimed in claim 5, wherein two abutments are adapted to be placed on either side of, and spaced from the bar, the abutments being disposed at substantially the same height, and each of the abutments at a substantially equal distance from the bar.

7. Support apparatus as claimed in claim 2, wherein the support plate is positioned at a small angle to the vertical so as to face generally upwards.

8. Support apparatus as claimed in claim 5, wherein the lower support plate is horizontally displaceable from a position in which said lower support plate can support a hindquarter in contact with the plate to a retracted position.

9. Support apparatus as claimed in claim 1, wherein the plate is adjustably pivotable about a horizontal axis which is parallel to the support surface of the plate so as to allow adjustment of a plane of the plate to a desired orientation relative to the vertical plane.

10. Support apparatus as claimed in claim 5, wherein the lower support plate is pivotable about a horizontal axis which is parallel to the support surface of the lower support plate for allowing appropriate adjustment of its plane to the quarter which is to be dressed.

11. Support apparatus for preparation of, especially sawing of bones in an animal forequarter to be cut-up, said forequarter being suspended at a leg end by suspension means, the apparatus comprising a plate having a support surface the plate positioned at a small angle to a vertical for facing generally upwards, a support bar supported on said plate surface, said bar extending in a vertical plane and generally parallel to a plane defined by the plate surface, and two abutments, each positioned on either side of the bar at substantially the same level and at an equal distance from the bar, and on the same side of the plate as the bar, the bar and the abutments positioned to support the fourquarter as suspended with the suspension means in a position generally vertically above the bar and a central portion of the surface so that a cleaving plane of an animal carcass faces away from, and is substantially parallel to, the surface, a neck of the fourquarter resting on an upper side of one of the abutments, a rear part of a rib cage of the four quarter resting on a lower side of the other abutment, and a rear edge of a shank or shoulder blade portion being against a side of the bar facing towards said one abutment.

12. Support apparatus for preparation of, especially sawing of bone in an animal rear quarter to be cut up, said rear quarter being suspended at a leg end by suspension means, the apparatus comprising a first plate having a generally vertical support surface, a support bar supported on said surface, said bar extending substantially vertically, a second support plate below said first plate and in front of the first plate, said second plate having a support surface which faces upwards and forms a greater angle to the vertical than that of the first plate, the horizontal direction of said surfaces being parallel, two separate downwardly converging rails supported on said surface of the second plate, said rails extending substantially parallel to the surface of said second plate and being arranged substantially symmetrically to a vertical plane which is normal to said surfaces and includes the bar, so that the rear quarter is suspended with the suspension means in a position generally vertically above the first plate and rests with its back on the said surface of the second plate with a spinal cut of the rear quarter against, and parallel to, one of the rails, on a rail side which faces the other rail so that a round of the rear quarter rests on the first plate with an outside of the round against, and substantially parallel to, the bar.

* * * * *